United States Patent
Mikolajczak

(10) Patent No.: US 8,861,164 B2
(45) Date of Patent: Oct. 14, 2014

(54) INTEGRATED OVERDRIVE AND OVERVOLTAGE PROTECTION DEVICE

(75) Inventor: Adrian Mikolajczak, Los Altos, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 44 days.

(21) Appl. No.: 13/350,565

(22) Filed: Jan. 13, 2012

(65) Prior Publication Data

US 2012/0200967 A1 Aug. 9, 2012

Related U.S. Application Data

(60) Provisional application No. 61/439,744, filed on Feb. 4, 2011.

(51) Int. Cl.
*H02H 3/20* (2006.01)
*H02H 9/02* (2006.01)

(52) U.S. Cl.
CPC *H02H 3/20* (2013.01); *H02H 9/025* (2013.01)
USPC ............... 361/93.8; 361/79; 361/18; 361/103

(58) Field of Classification Search
CPC .................. H03K 17/0822; H03K 2017/0806; H02H 5/044
USPC ...................... 361/79, 18, 103, 93.8
See application file for complete search history.

(56) References Cited

U.S. PATENT DOCUMENTS

| | | | | |
|---|---|---|---|---|
| 3,370,219 A | * | 2/1968 | Hupp | 322/28 |
| 3,702,418 A | * | 11/1972 | Obenhaus | 361/59 |
| 4,061,962 A | * | 12/1977 | Stewart | 323/273 |
| 4,163,186 A | * | 7/1979 | Haley | 340/636.15 |
| 4,533,970 A | * | 8/1985 | Brown | 361/58 |
| 4,652,964 A | | 3/1987 | Ziegenbein | |
| 4,759,362 A | * | 7/1988 | Taniguchi | 606/31 |
| 4,975,798 A | | 12/1990 | Edwards et al. | |
| 5,164,874 A | | 11/1992 | Okano et al. | |
| 5,539,299 A | * | 7/1996 | Fernandez et al. | 320/163 |
| 5,748,422 A | * | 5/1998 | Heaston et al. | 361/18 |
| 5,763,929 A | * | 6/1998 | Iwata | 257/467 |
| 5,973,977 A | | 10/1999 | Boyd et al. | |
| 6,114,672 A | | 9/2000 | Iwasaki et al. | |
| 6,320,275 B1 | * | 11/2001 | Okamoto et al. | 307/10.1 |
| 6,331,763 B1 | * | 12/2001 | Thomas et al. | 320/136 |

(Continued)

FOREIGN PATENT DOCUMENTS

DE 2917256 C2 11/1980
DE 10146947 A1 4/2003

OTHER PUBLICATIONS

"Tips for Enhancing ESD Protection", Littelfuse Inc.,Chicago, IL, 60631, USA, Application Note, 2009 (Copyright), pp. 1-4.

(Continued)

*Primary Examiner* — Zeev V Kitov
(74) *Attorney, Agent, or Firm* — Brake Hughes Bellermann LLP

(57) ABSTRACT

In one general aspect, an apparatus can include an overcurrent protection device. The apparatus can include an overvoltage protection device coupled to the overcurrent protection device and configured to cause the overcurrent protection device to decrease a current through the overvoltage protection device after a breakdown voltage of the overvoltage protection device increases in response to heat.

28 Claims, 10 Drawing Sheets

(56) References Cited

U.S. PATENT DOCUMENTS

| | | |
|---|---|---|
| 6,489,879 B1 | 12/2002 | Singh et al. |
| 6,492,792 B1 * | 12/2002 | Johnson et al. ............... 320/136 |
| 6,521,483 B1 | 2/2003 | Hashimoto |
| 6,700,766 B2 | 3/2004 | Sato |
| 6,937,454 B2 | 8/2005 | Mikolajczak et al. |
| 7,031,130 B2 * | 4/2006 | Simonelli et al. ............ 361/93.1 |
| 7,106,572 B1 | 9/2006 | Girard |
| 7,660,096 B2 | 2/2010 | Golubovic |
| 8,031,449 B2 | 10/2011 | Burns et al. |
| 2002/0024791 A1 | 2/2002 | Whitney et al. |
| 2002/0071233 A1 | 6/2002 | Bock et al. |
| 2005/0225421 A1 | 10/2005 | Furuta |
| 2005/0258805 A1 | 11/2005 | Thomas et al. |
| 2005/0275065 A1 | 12/2005 | Cogan et al. |
| 2006/0215342 A1 | 9/2006 | Montoya et al. |
| 2008/0130180 A1 | 6/2008 | De Palma et al. |
| 2009/0212937 A1 | 8/2009 | Stamer et al. |
| 2012/0127619 A1 | 5/2012 | Mikolajczak |

OTHER PUBLICATIONS

NXP Semiconductors, "AN10910: Protecting charger interfaces and typical battery charging topologies with external bypass transistors", Application Note, Rev. 01, Apr. 28, 2010, 17 pages.

Healy, et al, "An Investigation into the Physics of Blowing Polysilicon Fuses", Analog Devices, Report for 62nd European Study Group with Industry, Limerick 2008, 13 pages.

* cited by examiner

| JFET Device 810 | |
|---|---|
| BV$_{GDS}$ Minimum (V) | 26 |
| R$_{DS}$ (Ω) | 0.2 |
| R$_{DS}$ Test Current (A) | 0.5 |
| I$_{SAT}$ @ V$_{GS}$ = 0 (A) | 1.2 |
| V$_{GS}$ (off) (V) | -2 |
| I$_D$ (off) (A) | 0.01 |

FIG. 8C

INTEGRATED OVERDRIVE AND OVERVOLTAGE PROTECTION DEVICE

RELATED APPLICATION

This application claims priority to and the benefit of U.S. Provisional Patent Application Ser. No. 61/439,744, filed on Feb. 4, 2011, entitled, "Integrated Overdrive and Overvoltage Protection Device," which is incorporated herein by reference in its entirety.

TECHNICAL FIELD

This description relates to an integrated overdrive and overvoltage protection device.

BACKGROUND

Input power ports and/or related components can be protected from undesirable power conditions (e.g., overcurrent conditions and/or overvoltage conditions) using multiple devices. When the input power port is protected from undesirable power conditions using multiple devices, unpredictable and/or unwanted interactions can occur between the devices. For example, certain devices selected for overvoltage protection of the input power port may not interact in a favorable fashion with other devices selected for overcurrent protection of the input power port. Unmatched and/or independently operating components can result in various irregular failure modes and/or damage to downstream components intended for protection at the input power port. Thus, a need exists for systems, methods, and apparatus to address the shortfalls of present technology and to provide other new and innovative features.

SUMMARY

In one general aspect, an apparatus can include an overcurrent protection device. The apparatus can include an overvoltage protection device coupled to the overcurrent protection device and configured to cause the overcurrent protection device to decrease a current through the overvoltage protection device after a breakdown voltage of the overvoltage protection device increases in response to heat.

In another general aspect, a method can include receiving a current at an overvoltage protection device while the overvoltage protection device is in a breakdown state, and producing a feedback voltage based on the current and based on a breakdown voltage of the overvoltage protection device. The method can include providing the feedback voltage to an overcurrent protection device coupled to the overvoltage protection device, and changing the overcurrent protection device from an on-state to current-limiting state in response to the breakdown voltage of the overvoltage protection device exceeding a triggering breakdown voltage.

In another general aspect, an apparatus can include an overvoltage protection device having a voltage limit configured to increase in response to an increase in temperature of the overvoltage protection device, and an overcurrent protection device coupled to the overvoltage protection device and biased to an on-state. The apparatus can include a control circuit configured to provide, to the overcurrent protection device, at least a portion of a voltage across the overvoltage protection device at the voltage limit.

The details of one or more implementations are set forth in the accompanying drawings and the description below. Other features will be apparent from the description and drawings, and from the claims.

BRIEF DESCRIPTION OF THE DRAWINGS

FIG. 8C is a table that illustrates example specifications for components of the input power protection device shown in FIG. 8A.

DETAILED DESCRIPTION

Figure 1:
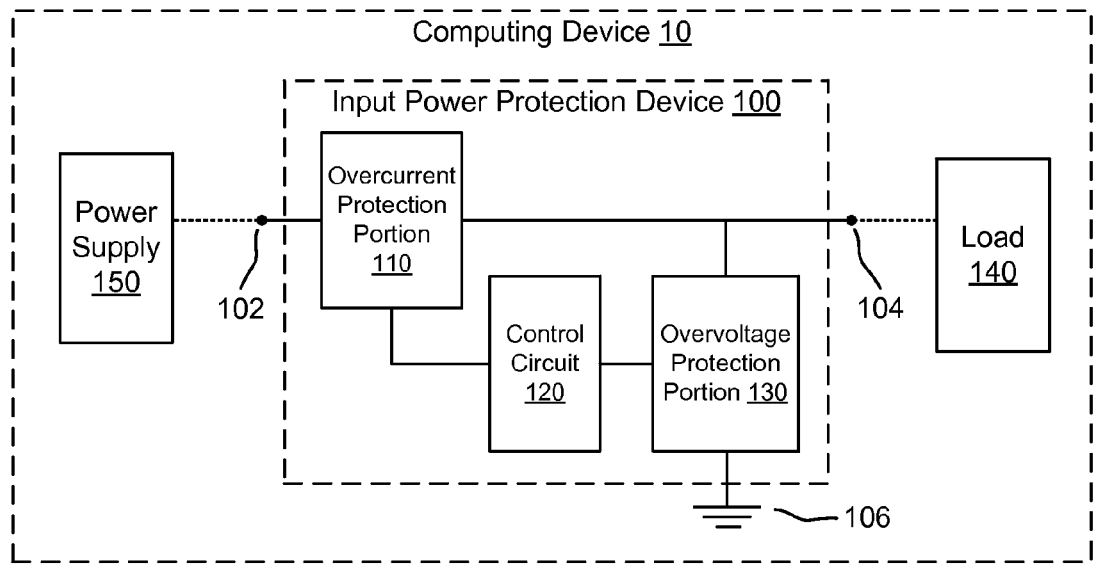
FIG. 1 is a block diagram that illustrates an input power protection device.

FIG. 1 is a block diagram that illustrates an input power protection device 100. As shown in FIG. 1, the input power protection device 100 is coupled to an overcurrent protection portion 110 (which can include one or more devices) coupled to an overvoltage protection portion 130 (which can include one or more devices). Also, the input power protection device 100 includes a control circuit 120 coupled to the overcurrent protection portion 110 and the overvoltage protection portion 130. Thus, the overcurrent protection portion 110 can be coupled to the overvoltage protection portion 130 when coupled via the control circuit 120. In some embodiments, the overcurrent protection portion 110 and the overvoltage protection portion 130 (and/or portions thereof) can collectively be referred to as components of the input power protection device 100.

The input power protection device 100 is configured to provide power protection to a load 140 from one or more undesirable power conditions. In some embodiments, the undesirable power conditions (which can include an overvoltage condition and/or an overcurrent condition) such as a voltage spike (related to power source noise) and/or a current spike (caused by load switching) may be produced by a power source 150. For example, the load 140 may include electronic components (e.g., sensors, transistors, microprocessors, application-specific integrated circuits (ASICs), discrete components, circuit board) that could be damaged in an undesirable fashion by relatively fast increases in current and/or voltage produced by the power source 150 in an energy pulse (e.g., a sustained energy pulse). Accordingly, the input power protection device 100 can be configured to detect and prevent these relatively fast increases in current and/or voltage from damaging the load 140 and/or other components associated with the load 140 (such as a circuit board).

In some embodiments, the overcurrent protection portion 110 and the overvoltage protection portion 130 can be included in the input power protection device 100 so that the overcurrent protection portion 110 provides series overcurrent protection and the overvoltage protection portion 130 provides shunt to ground overvoltage protection. In some embodiments, the series overcurrent protection provided by the overcurrent protection portion 110 and the shunt to ground overvoltage protection provided by the overvoltage protection portion 130 can be integrated into a single package of the input power protection device 100 so that the input power protection device 100 is a standalone, discrete component.

The overvoltage protection portion 130 of the input power protection device 100 can be configured to protect the load 140 from, for example, sudden or sustained increases in voltage produced by the power source 150. In other words, the overvoltage protection portion 130 of the input power protection device 100 can be configured to provide voltage protection to the load 140 in response to, for example, an overvoltage event. In some embodiments, the overvoltage protection portion 130 of the input power protection device 100 can be configured to protect the load 140 from voltage produced by the power source 150 based on one or more voltage conditions (e.g., a voltage level sustained over a specified period of time, a voltage exceeding a threshold voltage). Specifically, the overvoltage protection portion 130 can be configured to limit (e.g., clamp) a voltage across the overvoltage protection device (and a downstream load) at a breakdown voltage (e.g., a threshold voltage, a voltage limit, a clamping voltage). When the overvoltage protection portion 130 is limiting a voltage at the breakdown voltage, the overvoltage protection portion 130 can be referred to as being in a breakdown state.

In some embodiments, the overvoltage protection portion 130 of the input power protection device 100 can be, or can include, for example, any type of depletion mode device and/or transient voltage suppressor (TVS) (also can be referred to as a transient voltage suppression device). In some embodiments, the overvoltage protection portion 130 of the input power protection device 100 can be, or can include, for example, any type of device configured to breakdown and limit (e.g., clamp) a voltage. The overvoltage protection portion 130 can include any type of device that has a limiting voltage (e.g., a breakdown voltage) that changes with temperature and/or current. Specifically, the overvoltage protection portion 130 can include any type of device that has, for example, a limiting voltage with a positive temperature coefficient characteristic (e.g., a limiting voltage that increases with increasing temperature). In some embodiments, the overvoltage protection portion 130 of the input power protection device 100 can include one or more TVS diodes (e.g., a zener diode with a positive temperature coefficient), one or more metal oxide varistors, and/or so forth. For example, if the overvoltage protection portion 130 is, or includes, a TVS diode, the TVS diode can be configured to limit a voltage across the TVS diode at a TVS breakdown voltage.

The overcurrent protection portion 110 of the input power protection device 100 can be configured to protect the load 140 (and/or the overvoltage protection portion 130) from, for example, sudden or sustained increases in current produced by the power source 150. In other words, the overcurrent protection portion 110 of the input power protection device 100 can be configured to provide current protection to the load 140 (and/or the overvoltage protection portion 130) in response to, for example, an overcurrent event. In some embodiments, the overcurrent protection portion 110 of the input power protection device 100 can be configured to protect the load 140 (and/or the overvoltage protection portion 130) from current produced by the power source 150 based on one or more current conditions (e.g., a current level sustained over a specified period of time, a current exceeding a threshold voltage, a short high current pulse).

In some embodiments, the overcurrent protection portion 110 can be, or can include a portion, configured to cause a change in a conduction state from an on-state (e.g., a high conduction state, a low resistance state, a non-saturated state) to a current-limiting state (e.g., a low conduction state, a high resistance state) that prevents or limits (significantly limits) current from flowing to the load 140 (and/or through the overvoltage protection portion 130) when a current output from the power source 150 (and through the overcurrent protection portion 110). In some embodiments, the overcurrent protection portion 110 can be saturated while in the current-limiting state. When in the current-limiting state, current can be limited to a current limit, which can be referred to as a saturation current limit or as a saturation current.

For example, in some embodiments, the overcurrent protection portion 110 can be, or can include, any type of semiconductor device configured to limit a current from the power source 150 to the load 140 (and/or the overvoltage protection portion 130). In some embodiments, the overcurrent protection portion 110 can be, or can include, any type of saturating device configured to limit current (to a current limit) based on electric fields. As a specific example, the overcurrent protection portion 110 can be, or can include, a junction field-effect-transistor (JFET) device, an accumulation channel field-effect-transistor (ACCUFET) device, and/or so forth. If the overcurrent protection portion 110 includes a JFET device, the JFET device can be configured to limit current through the JFET device to a saturation current of the JFET device when the JFET device is saturated. Accordingly, the JFET device can protect the load 140 (and/or the overvoltage protection portion 130) from a current produced by the power source 150 that is at (or in excess of) the saturation current in a current-limiting state (which can occur when the JFET device is saturated). In other words, the JFET device can limit the current to the load 140 (and/or to the overvoltage protection portion 130) and produced by the power source 150 to the saturation current while in a current-limiting state. In some embodiments, after an overcurrent condition has ended, the overcurrent protection portion 110 can be configured to change conduction states from the current-limiting state (e.g., the low conduction state, the high resistance state) to the on-state (e.g., the high conduction state, the low resistance state). In some embodiments, when in the on-state, the JFET device may not be saturated.

In some embodiments, the current-limiting capability of the overcurrent protection portion 110 can vary when the overcurrent protection portion 110 is in the current-limiting state. For example, when the overcurrent protection portion 110 is in the current-limiting state, current through the overcurrent protection portion 110 can be reduced slightly from current through the overcurrent protection portion 110 when the overcurrent protection portion is in the on-state (e.g., non-saturated state). The reduction in current through the overcurrent protection portion 110 can be triggered by a voltage (also can be referred to as a control voltage) applied to the overcurrent protection portion 110 via, for example, a control pin. A change (e.g., a decrease, an increase) in the voltage applied to the overcurrent protection portion 110 can trigger a further reduction in the current through the overcurrent protection portion 110. In some embodiments, the overcurrent protection portion 110 can have a threshold control voltage at which current through the overcurrent protection portion 110 can be decreased or increased.

As a specific example, if the overcurrent protection portion 110 is a JFET device, a specified gate voltage (e.g., a specified absolute value of the gate voltage, a specified negative gate to source voltage ($V_{GS}$)) applied to the JFET device (e.g., a gate pin of the JFET device) can cause a decrease (e.g., a reduction) in a size of a channel (e.g., a conduction channel) of the JFET device and a corresponding decrease in current through the JFET device (because of a decreased saturation current of the JFET device). The size of the channel of the JFET device can be decreased (using a voltage applied to the gate of the JFET device) until current no longer flows through (or substantially does not flow through) the JFET device. The JFET device is a class A semiconductor device configured to modulate the resistance of the channel within the JFET device in response to an applied voltage (e.g., applied negative voltage, applied control voltage) on the gate of the JFET device.

In some embodiments, the overcurrent protection portion 110 of the input power protection device 100 can be, or can include, for example, any type of device configured to change between conduction states (e.g., from the on-state to the current-limiting state). In other words, the overcurrent protection portion 110 can include any type of current sensitive switch device that has a current-limiting state (e.g., a high resistance state).

In some embodiments, the overcurrent protection portion 110 can be, or can include, a portion configured to cause an open circuit (e.g., melt to produce an open circuit, blow open to produce an open circuit) that prevents current from flowing to the load 140 when a current output from the power source 150 (and through the overcurrent protection portion 110) exceeds a threshold current (within a specified period of time). For example, in some embodiments, the overcurrent protection portion 110 of the input power protection device 100 can be, or can include, for example, a fuse, a silicon current limit switch, a polysilicon-based fuse, an electronic fuse (e-fuse), a polymer positive temperature coefficient (PPTC) device, a ceramic positive temperature coefficient (CPTC) device, and/or so forth. As a specific example, a fuse can be used in conjunction with a JFET device within the overcurrent protection portion 110.

In some embodiments, the overcurrent protection portion 110 and the overvoltage protection portion 130 can be configured to interoperate (e.g., can be matched). In other words, the overcurrent protection portion 110 and the overvoltage protection portion 130 can be configured (e.g., sized) so that the overcurrent protection portion 110 and the overvoltage protection portion 130 collectively operate in a desirable fashion. For example, the overvoltage protection portion 130 can be configured to cause the overcurrent protection portion 110 to change from an on-state to a current-limiting state.

In some embodiments, the overvoltage protection portion 130 can be configured to cause the overcurrent protection portion 110 to change to the current-limiting state in response to the overvoltage protection portion 130 being heated (e.g., increasing in temperature, increasing in temperature in response to a current). The heating of the overvoltage protection portion 130 can be caused by current through (e.g., current shunted through) the overvoltage protection portion 130 and/or can be caused by heat transferred to the overvoltage protection portion 130 from other components of the input power protection device 100 (e.g., heat from the overcurrent protection portion 110). Thus, in some embodiments, the overvoltage protection portion 130 can be configured to cause the overcurrent protection portion 110 to change to the current-limiting state in response to a current through the overvoltage protection portion 130. As a specific example, a zener diode included in the overvoltage protection portion 130 can have a breakdown voltage that increases with an increase in temperature. The increasing breakdown voltage of the zener diode within the overvoltage protection portion 130 can be leveraged to trigger the overcurrent protection portion 110 to change to a current-limiting state and limit current through the overcurrent protection portion 110.

In some embodiments, the overcurrent protection portion 110 can be, or can include, a device that is biased to operate in an on-state. In other words, the overcurrent protection portion 110 can operate in the on-state until triggered to change to the current-limiting state. In such embodiments, the overvoltage protection portion 130 can be configured to cause the overcurrent protection portion 110 to change from the on-state to the current-limiting state, and remain in the current-limiting state. Also, in such embodiments, the overcurrent protection portion 110 can change from the current-limiting state back to the on-state when the overvoltage protection portion 130 is no longer triggering the overcurrent protection portion 110 to remain in the on-state. For example, the overcurrent protection portion 110 can be, or can include, a JFET device that is biased (and configured) to operate in an on-state (without limiting current during normal load 140 and/or power source 150 operation) until a specified gate voltage (e.g., a control voltage, a specified negative gate to source voltage ($V_{GS}$)) is applied to the JFET device to decrease (e.g., reduce, pinch off) at least a portion of a conduction channel within the JFET device to a point that the JFET device limits current.

As shown in FIG. 1, the input power protection device 100 includes a control circuit 120. The control circuit 120 can be configured to facilitate interactions between the overvoltage protection portion 130 and the overcurrent protection portion 110. For example, the control circuit 120 can be configured to define a feedback signal (e.g., a feedback voltage and/or a feedback current) that can be configured to trigger the overcurrent protection portion 110 to change conduction states. The feedback signal can be defined (e.g., produced) by the control circuit 120 based on the behavior of the overvoltage protection portion 130. In some embodiments, the control circuit 120 can be any kind of control circuit configured to provide a feedback signal to the overcurrent protection portion 110 so that the overcurrent protection portion 110 operates (e.g., controls current, reduces current) in a current-limiting state in response to a voltage (e.g., a control voltage) across the overvoltage protection portion 130. In some embodiments, the control circuit 120 can include various types of devices such as resistors, transistors, control circuitry, and/or so forth. More details related to interactions between the components of the input power protection device 100 are described, for example, in connection with the figures below.

In some embodiments, interactions between the components of the input power protection device 100 can be protective interactions. In other words, one component from the input power protection device 100 can be configured to protect another component of the input power protection device 100. For example, the overcurrent protection portion 110 can be configured to change from an on-state (non-saturated state) to a current-limiting state so that current through the overvoltage protection portion 130 may be limited by the overcurrent protection portion 110. Also, the overvoltage protection portion 130 can be configured to limit a voltage such that a voltage drop across the overcurrent protection portion 110 may also be limited. In some embodiments, the interactions of the overcurrent protection portion 110 (which decrease power absorbed by the overvoltage protection portion 130) and the overvoltage protection portion 130 (which turns off the overcurrent protection portion 110) can result in an input power protection component that absorbs less power than would otherwise be absorbed without the interactions between the overcurrent protection portion 110 and the overvoltage protection portion 130 described above. More details related to mutual protection provided by components within the input power protection device 100 are described, for example, in more detail in connection with figures below.

In some embodiments, the overcurrent protection portion 110, the control circuit 120, and/or the overvoltage protection portion 130 can be integrated into a single component. In other words, the overcurrent protection portion 110, the control circuit 120, and/or the overvoltage protection portion 130 can be integrated into the input power protection device 100 so that the input power protection device 100 is a single integrated component (e.g., single discrete component). Said differently, the input power protection device 100 can be a single, integrated component that includes the overcurrent protection portion 110, the control circuit 120, and/or the overvoltage protection portion 130. For example, the control circuit 120 and the overvoltage protection portion 130 can be integrated into a single, discrete device, and the overcurrent protection portion 110 can be integrated into a separate single, discrete device. Specifically, the overcurrent protection portion 110, the control circuit 120, and/or the overvoltage protection portion 130 can be integrated into a single package of the input power protection device 100 with three terminals—an input terminal 102, an output terminal 104, and a ground terminal 106 (which can collectively be referred to as terminals). In some embodiments, the terminals can be referred to as ports, pins, portions, and/or so forth (e.g., input port 102 can be referred to input pin 102 or as input portion 102).

Because the overcurrent protection portion 110, the control circuit 120, and/or the overvoltage protection portion 130 can be integrated into a single component, assembly can be simplified and production costs can be reduced. In some embodiments, the overcurrent protection portion 110, the control circuit 120, and/or the overvoltage protection portion 130 can be integrated into a single component (i.e., the input power protection device 100) so that installation of a separate overcurrent protection device and overvoltage protection device into a computing device (e.g., such as computing device 10) may not be necessary. Instead, overcurrent protection and overvoltage protection can be provided by the input power protection device 100, which includes both the overcurrent protection portion 110 and the overvoltage protection portion 130. In some embodiments, circuit board space can be more efficiently allocated by using the input power protection device 100, which can be a single component, than if overcurrent protection and overvoltage protection were achieved using multiple separate components. In some embodiments, heat transfer between components of the input power protection device 100 can be facilitated through integration of one or more of the components of the input power protection device 100 into a single, discrete component.

In sum, the voltage across the overvoltage protection portion 130 can increase and trigger the overcurrent protection portion 110 to change to a current-limiting state in response to heat (which can be caused by current through the overvoltage protection portion 130) and/or current (which may not cause heating of the overvoltage protection portion 130 if the current rises rapidly). The rise in the voltage across the overvoltage protection portion 130 in response to current (e.g., current alone) can be due, at least in part, to the resistance of the overvoltage protection portion 130. Also, the overcurrent protection portion 110 can be changed to (or can be in) a current-limiting state in response to a relatively high voltage across the overvoltage protection portion 130 and/or a relatively large current through the load 140 (which can cause the overcurrent protection portion 110 to saturate). Thus, a combination of scenarios, including any of the above, can trigger operation of the input power protection device 100.

As shown in FIG. 1, the input power protection device 100, the power source 150, and the load 140 can be included in (e.g., integrated into) a computing device 10. In some embodiments, the computing device 10 can be, for example, a computer, a personal digital assistant (PDA), a host computer, a memory component (e.g., a hard disk drive), an adaptor, an electronic measurement device, a data analysis device, a cell phone, an electronic device, and/or so forth.

In some embodiments, the power source 150 can be any type of power source such as, for example, a switched mode power supply, a direct-current (DC) power supply, an alternating-current (AC) power supply, and/or so forth. In some embodiments, the power source 150 can include a power source that can be any type of power source such as, for example, a direct current (DC) power source such as a battery, a fuel cell, and/or so forth.

In some embodiments, the power source 150 can be a signal source such as a transmitter configured to transmit one or more signals (e.g., data signals). In some embodiments, the power source 150 can be coupled via a wire, or wirelessly coupled to the input power protection device 100. In such embodiments, one or more portions of the input power protection device 100 can be included in a transceiver configured to receive one or more signals from the power source 150.

Figure 2:
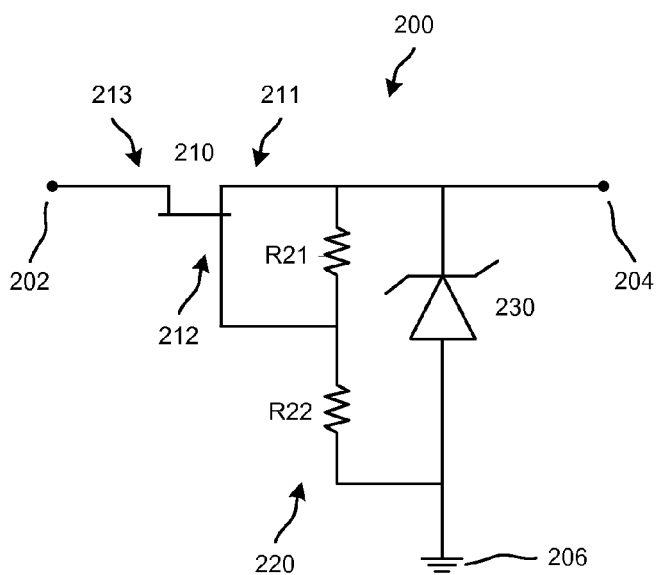
FIG. 2 is a schematic of components of an input power protection device.

FIG. 2 is a schematic of components of an input power protection device 200. As shown in FIG. 2, the input power protection device 200 includes a JFET device 210, which functions as an overcurrent protection portion of the input power protection device 200. The input power protection device 200 also includes a zener diode 230 (which can be a type of TVS diode and can be generally referred to as a zener diode device), which functions as an overvoltage protection portion of the input power protection device 200.

The JFET device 210 can be configured to function as an electronically-controlled switch or as a voltage-controlled resistance within the input power protection device 200. In some embodiments, the JFET device 210 and/or the zener diode 230 can be a semiconductor device formed using a PN junction (which is formed with or associated with a p-type semiconductor and an n-type semiconductor) in any type of semiconductor materials such as, for example, silicon (e.g., a doped silicon), gallium arsenide, germanium, silicon carbide, and/or so forth. In other words, the JFET device 210 and/or the zener diode 230 can include a silicon substrate that includes (or is associated with) at least a portion of a PN junction. In some embodiments, the PN junction can be produced in a single or multiple crystals of semiconductor, for example, by doping, using ion implantation, diffusion of dopants, epitaxial growth, and/or so forth.

As shown in FIG. 2, input power protection device 200 includes a control circuit 220. Specifically, in this embodiment, the control circuit 220 is a voltage divider that includes a resistor R21 and a resistor R22. The resistor R21 is coupled between a gate 212 and a source 211 of the JFET 210. The resistor R22 is coupled between the gate 212 of the JFET 210 and a ground terminal 206 (also can be referred to as a ground node).

In this embodiment, the input power protection device 200 includes three terminals—an input terminal 202, an output terminal 204, and the ground terminal 206. As shown in FIG. 2, the input terminal 202 is coupled to (e.g., electrically coupled to) a drain 213 of the JFET device 210. The zener diode 230 is coupled to (e.g., electrically coupled to) the source 211 of the JFET device 210, which is also coupled to (e.g., electrically coupled to) the output terminal 204. Thus, the source 211 of the JFET device 210 and the zener diode 230 are both coupled to the output terminal 204 and function as a single node. The zener diode 230 is also coupled to the ground terminal 206.

In this embodiment, the zener diode 230 can have a breakdown voltage that increases with an increase in temperature (i.e., has a positive temperature coefficient) during, for example, an overvoltage event. The increasing breakdown voltage of the zener diode 230 can be leveraged to trigger the JFET device 210 to change from an on-state (to which the JFET device 210 is biased) to a current-limiting state via the control circuit 220.

Specifically, during an overvoltage event, the zener diode 230 can be configured to limit (e.g., clamp) a voltage across the input power protection device (e.g., across the zener diode 230) to a breakdown voltage of the zener diode 230. The zener diode 230 can shunt current associated with the overvoltage event to the ground node. While shunting current to the ground node, the zener diode 230 (e.g., a PN junction within the zener diode 230) can increase in temperature in response to the current flowing through the zener diode 230. Accordingly, the breakdown voltage of the zener diode 230 will increase in response to the temperature increase.

The resistors R21, R22 of the control circuit 220 can be configured to apply a voltage (e.g., a control voltage) to the JFET device 210 (e.g., to the gate 212 of the JFET device 210) that will cause the JFET device 210, which is biased to an on-state, to change from the on-state to a current-limiting state (which can occur when the JFET device 210 is saturated). Specifically, the resistors R21, R22 can be sized so that when the breakdown voltage of the zener diode 230 reaches a specified value, the JFET device 210 will change (e.g., start to change) from the on-state to the current-limiting state (for a given current through the JFET device 210). In some embodiments, the breakdown voltage of the zener diode 230 at which the JFET device 210 will change to the current-limiting state can be referred to as a triggering breakdown voltage or as a triggering breakdown point. In some embodiments, the voltage (e.g., control voltage) applied to the gate 212 the JFET device 210 can be referred to as a feedback voltage or as a feedback signal. As shown in FIG. 2, the voltage across the JFET device 210 (i.e., the voltage across resistor R21) will be a voltage drop (i.e., a negative voltage) from the source 211 to the gate 212 of the JFET device 210.

The breakdown voltage of the zener diode 230 can increase as the temperature of the zener diode 230 increases. The gate to source voltage of the JFET can increase if referenced as an absolute voltage (or decrease if referenced as a negative voltage) within the increasing voltage across the zener diode 230 which will be clamped at breakdown voltage of the zener diode 230. The resistance of the JFET device 210 will increase with increasing gate voltage (e.g., control voltage), and current through the JFET device 210 will decrease. The current through the JFET device 210 will decrease because a channel of the JFET device 210 will close (e.g., continue closing, gradually close, turned-off, become restricted) as the gate to source voltage (i.e., an absolute value of the gate to source voltage) increases while the JFET device 210 is in the current-limiting state.

Figure 3A:
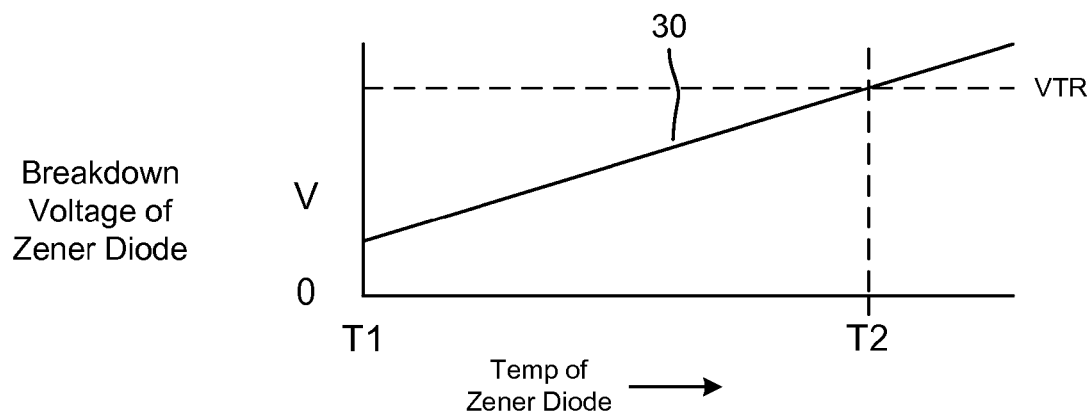
FIG. 3A is a graph that illustrates a breakdown voltage of the zener diode shown in FIG. 2.
Figure 3B:
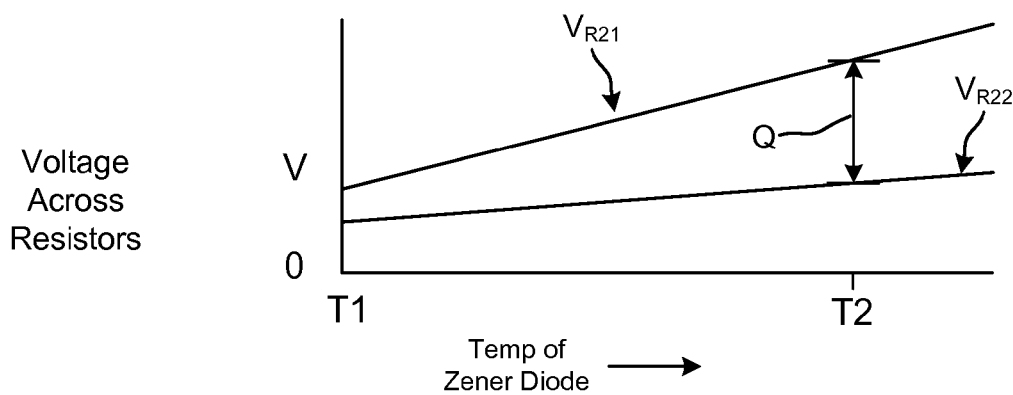
FIG. 3B is a graph that illustrates the voltages across the resistors shown in FIG. 2.
Figure 3C:
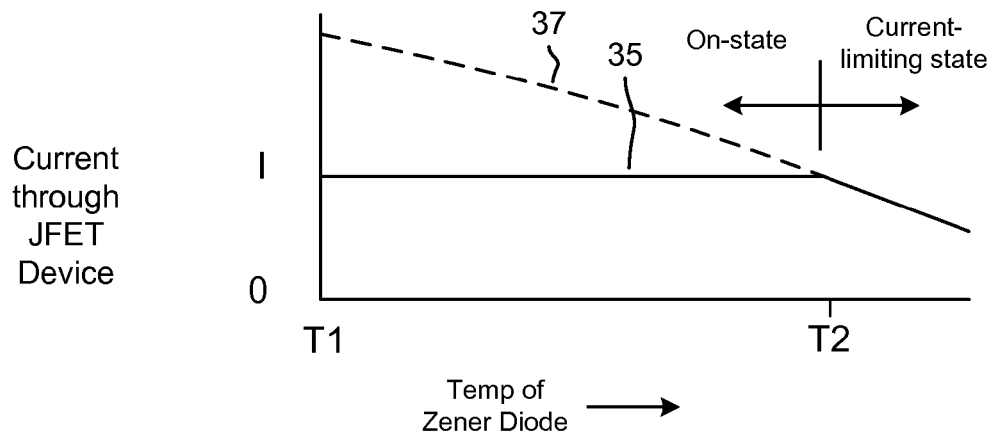
FIG. 3C is a graph that illustrates current through the junction field-effect-transistor (JFET) device shown in FIG. 2.

FIGS. 3A through 3C are graphs that illustrate the operation of the input power protection device 200. Specifically, FIG. 3A is a graph that illustrates a breakdown voltage 30 of the zener diode shown in FIG. 2. FIG. 3B is a graph that illustrates the voltages $V_{R21}$ and $V_{R22}$ across the resistors shown in FIG. 2. FIG. 3C is a graph that illustrates current 35 through the JFET device shown in FIG. 2. As shown in FIGS. 3A through 3C, the x-axis of each of the graphs is the temperature of the zener diode and the temperature of the zener diode is increasing to the right. Each of the graphs start at a temperature T1 of the zener diode and assume that the zener diode is in a breakdown state in response to an energy pulse (e.g., an overvoltage event and/or an overcurrent event).

As shown in FIG. 3A, as the temperature of the zener diode increases, the breakdown voltage 30 of the zener diode increases. In this embodiment, the breakdown voltage 30 of the zener diode increases in approximately a linear fashion. In some embodiments, the breakdown voltage 30 of the zener diode may not increase in approximately a linear fashion. In some embodiments, the breakdown voltage 30 of the zener diode can increase in response to a current shunted through the zener diode while the zener diode is in a breakdown state. In some embodiments, the current shunted through the zener diode can be associated with the energy pulse.

In some embodiments, the temperature T1 can be approximately 0° C. and the temperature T2 can be a temperature greater than T1. In some embodiments, the temperature T1 can be greater than 0° C. (e.g., 25° C.) or less than 0° C. (e.g., −25° C.). In some embodiments, the temperature T2 can be 50° C. or more (e.g., 100° C., 200° C., 300° C., 800° C.). In some embodiments, breakdown voltage can be, for example, between millivolts and volts. For example, the breakdown voltage can be 5 volts, 50 volts, and so forth.

In FIG. 3B, the voltages $V_{R21}$ and $V_{R22}$, which respectively correspond with the resistors R21 and R22, are depicted with respect to ground. Accordingly, the voltage $V_{R21}$ tracks with the breakdown voltage 30 of the zener diode, and the voltage across the resistor R21 is the difference between the voltage $V_{R21}$ and the voltage $V_{R22}$. As shown in FIG. 3B, as the breakdown voltage 30 of the zener diode increases with an increase in the temperature of the zener diode, the voltages $V_{R21}$ and $V_{R22}$ also increase. In this embodiment, the gate to source voltage (i.e., the absolute value of the gate to source voltage) of the JFET device (which is a negative value) is the voltage across the resistor R21, which is the difference between the voltage $V_{R21}$ and the voltage $V_{R22}$.

As shown in FIG. 3C, current 37 through the JFET device is a saturation current 37 of the JFET device. Current 37 is represented as a dashed line because the current 37 represents a theoretical maximum current through the JFET device when the JFET device is saturated. The saturation current 37 of the JFET device is a function of the gate to source voltage of the JFET device. As shown in FIG. 3C, the saturation current 37 decreases as the gate to source voltage of the JFET device increases (which is shown in FIG. 3B) because the channel of the JFET device decreases (or the resistance through the JFET device increases) with increasing gate to source voltage Also, as shown in FIG. 3C in this illustrative example, the current 35 through the JFET device is assumed constant (or substantially constant) (and is operating, at least initially, well below the current 37) until the temperature of the zener diode is at temperature T2. At temperature T2, the current 35 through the JFET device (which is the actual current sourced through the JFET device) intersects with the current 37 through the JFET device when the JFET device is saturated.

When the temperature of the zener diode reaches temperature T2, the breakdown voltage 30 of the zener diode is at a triggering breakdown voltage VTR as shown in FIG. 3A. When the triggering breakdown voltage VTR is reached at temperature T2, the gate to source voltage of the JFET device is Q, which is the difference between the voltage $V_{R21}$ and the voltage $V_{R22}$, as shown in FIG. 3B. When the gate to source voltage of the JFET device is Q the JFET device changes from an on-state to a current-limiting state as shown in FIG. 3C. As shown in FIG. 3C, the current 35 through the JFET device does not start decreasing and is not considered in a current-limiting state until the JFET device is saturated. When in the current-limiting state, the current 35 through the JFET device decreases along the saturation current 37 curve.

As the breakdown voltage 30 of the zener diode continues to increase as the temperature of the zener diode increases beyond temperature T2 (shown in FIG. 3A), the absolute value of the gate to source voltage ($V_{GS}$) of the JFET device continues to increase (or decrease if referenced as a negative voltage) (as shown in FIG. 3B). Accordingly, the resistance of the JFET device increases and current 30 through the JFET device decreases as shown in FIG. 3C. The current 30 through the JFET device decreases because a channel through the JFET device closes (e.g., continues to close, turns-off, restricts) as the gate to source voltage (i.e., an absolute value of the gate to source voltage) increases while the JFET device is in the current-limiting state.

In this embodiment, the current 35 through the JFET device is constant (e.g., substantially constant) between temperatures T1 and T2. In some embodiments, the current through the JFET device may vary (e.g., increase, decrease) based on the characteristics of the energy pulse and/or component coupled to the input power protection device.

Although not shown, if the current 35 through the JFET device were higher than that shown in FIG. 3C, a temperature of the zener diode at which the current 35 would be limited through the JFET device would be lower than temperature T2. Accordingly, the JFET device would change from the on-state to the current-limiting state at the temperature lower than temperature T2. Also, due to the higher current 35, which would also flow through the zener diode, the zener diode could increase in temperature faster (e.g., during a shorter time period) than associated with FIG. 3A. Thus, the zener diode and JFET device can provide faster power protection for a relatively high energy pulses (e.g., relatively high currents) than for relatively low energy pulses (e.g., relatively low currents).

Referring back to FIG. 2, the JFET device 210 is configured to float above ground through the resistor R22. Accordingly, the JFET device 210 does not need to be configured to handle the full rail-to-ground voltage that is handled by the zener diode 230. Thus, in some embodiments, the JFET device 210 may be configured with a voltage rating that is lower than would be needed if tied to ground. Also, because the current through the zener diode 230 will be limited to the saturation current of the JFET device 210 (and because the zener diode 230 thermally triggers the JFET device 210 to reduce its current in response to the temperature rise of the zener diode 230), the zener diode 230 can be sized (e.g., decreased in size) according to the saturation current of the JFET device 210.

Also, as the resistance of the JFET device 210 increases, the current through the JFET device 210 will decrease and result in a lower current through the zener diode 230. In some instances, the lower current through the zener diode 230 will result in a lower temperature of the zener diode 230 (if the current decrease is sustained for a sufficient period of time) and a lower voltage across the zener diode 230. The lower voltage across the zener diode 230 will counteract the increase in resistance of the JFET device 210. These opposing forces can result in a steady-state operation of the input power protection device 200. The rate of heating of the zener diode 230, while the input power protection device 200 is operating in a stead-state, will be at a steady-state (when the current is settled through the zener diode 230). In some embodiments, these opposing forces can result in oscillations in operation of the input power protection device 200 until a steady-state operating point of the input power device 200 is reached. Steady-state operation of input power devices is discussed in more detail in connection with FIGS. 5A through 5E.

Although this embodiment, and many of the embodiments described herein, are discussed in the context of a zener diode and a JFET device, many types of overvoltage protection portion and/or overcurrent protection portion may be used with, or instead of, the zener diode and/or the JFET device. For example, the overvoltage protection portion of the input power protection device 200 can be any type of device that has a breakdown voltage that changes with (e.g., increases with) temperature. The overcurrent protection portion of the input power protection device 200 can be any type of device that that can be biased to an on-state, change from the on-state to a current-limiting state, and can limit a current through the device while in the current-limiting state.

FIGS. 4A through 4E are graphs that illustrate the behavior of components of an input power protection device in response to an energy pulse. The input power protection device includes an overvoltage protection device, a control circuit, and an overcurrent protection device such as those shown in FIGS. 1 and 2. The graphs illustrate power protection provided by the components of the input power protection device in response to an energy pulse.

Figure 4A:
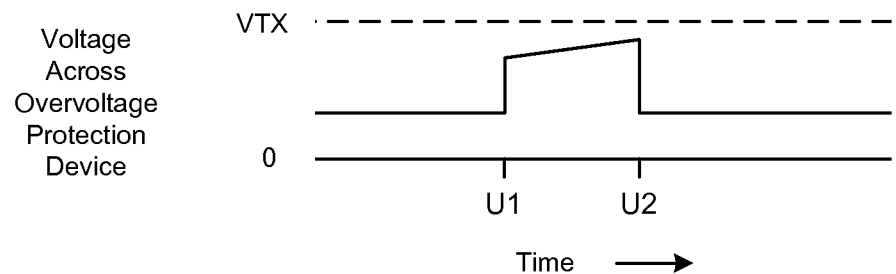
FIGS. 4A through 4E are graphs that illustrate the behavior of components of an input power protection device in response to an energy pulse.
Figure 4B:
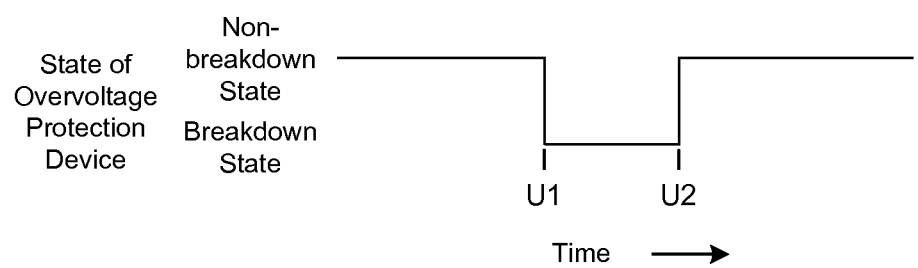
Figure 4C:
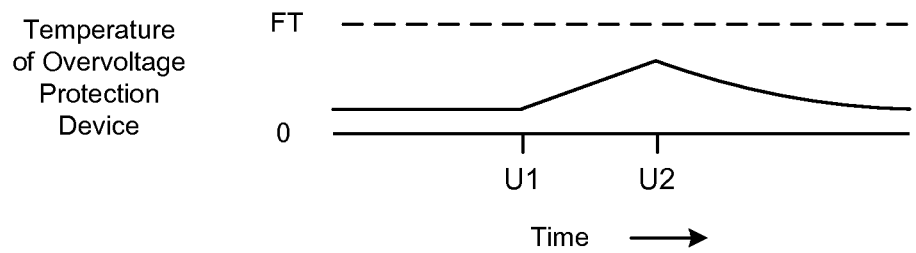
Figure 4D:
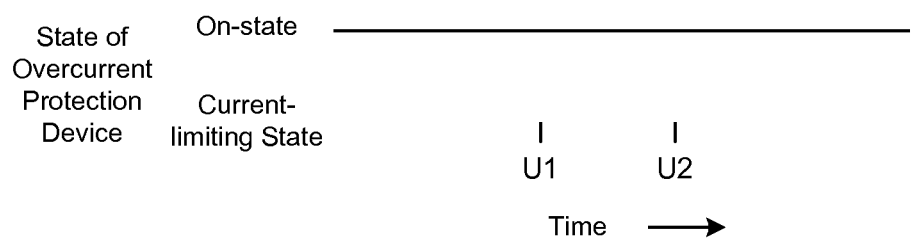
Figure 4E:
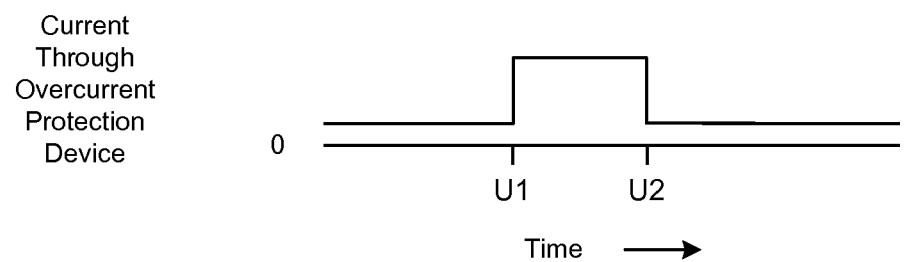

FIG. 4A is a graph that illustrates a voltage across the overvoltage protection device, FIG. 4B is a graph that illustrates a state of the overvoltage protection device, and FIG. 4C is a graph that illustrates a temperature of the overvoltage protection device. FIG. 4D is a graph that illustrates a state of the overcurrent protection device, and FIG. 4E is a graph that illustrates a current through the overcurrent protection device. In FIGS. 4A through 4E, time is increasing to the right, and the energy pulse starts at approximately time U1 and ends at approximately time U2.

As shown in FIG. 4A, in response to the energy pulse starting at approximately time U1, the voltage across the overvoltage protection device increases abruptly approximately at time U1. In this embodiment, the overvoltage protection device (which can be a zener diode) changes to a breakdown state from a non-breakdown state (e.g., a normal operation state, an off-state) in response to the energy pulse between approximately times U1 and U2 as shown in FIG. 4B. Accordingly, the voltage across the overvoltage protection device between times U1 and U2 (during the time period between time U1 and U2) is approximately the breakdown voltage of the overvoltage protection device.

Also, in response to the energy pulse, the temperature of (e.g., the temperature of a junction of, the temperature of a semiconductor substrate of) the overvoltage protection device increases starting at approximately time U1 as shown in FIG. 4C. In this embodiment, the temperature of the overvoltage protection device increases approximately linearly.

As shown in FIG. 4A, in response to the increase in the temperature of the overvoltage protection device shown in FIG. 4C, the voltage across the overvoltage protection device increases approximately linearly between approximately times U1 and U2. In other words, the breakdown voltage of the overvoltage protection device increases in response to the temperature increase. Thus, the voltage across the overvoltage protection device, which is clamped at the breakdown voltage, also increases.

As shown in FIG. 4A, the voltage across the voltage protection device does not rise to the triggering breakdown voltage VTX. Although not shown, in some embodiments, the voltage across the zener diode can increase between times U1 and U2 in response to a current shunted through the zener diode while the zener diode is in the breakdown state. The current shunted through the zener diode can be associated with the energy pulse. Although not shown, in some embodiments, if the duration of the energy pulse were longer than the time period between times U1 and U2 (as shown in FIG. 4A), the voltage across the overvoltage protection device could have increased beyond the breakdown voltage VTX.

Also as shown in FIG. 4C, the temperature of the overvoltage protection device remains below a fail temperature FT (also can be referred to as a breakdown temperature). In some embodiments, the overvoltage protection device can fail short when the temperature of the overvoltage protection device exceeds the fail temperature FT. For example, if the overvoltage protection device is a zener diode, migration of metals across a PN junction of the zener diode in response to a temperature above the fail temperature FT of the zener diode can result in a short within the zener diode (e.g., across the PN junction).

In some embodiments, the rate of the temperature increase of the overvoltage protection device can depend on, for example, packaging (or a lack thereof) around the overvoltage protection device, heat (or a lack thereof) from other devices around the overvoltage protection device, and/or so forth. For example, in some embodiments, one or more heat sinks (e.g., semiconductor components, packaging) associated with (e.g., coupled to, around) the overvoltage protection device can be configured so that they absorb heat that would otherwise be directed to the overvoltage protection device. In such instances, the rate of the temperature increase of the overvoltage protection device in response to an energy pulse may be faster than without the heat sink(s). In some embodiments, the overvoltage protection device can be associated with one or more heat sources (e.g., devices, resistors) (and/or insulators) configured to direct (and/or contain) heat to the overvoltage protection device so that the temperature increase of the overvoltage protection device, and resulting voltage across the voltage protection device when in the breakdown state, will increase at a relatively rapid rate (e.g., increase beyond the triggering breakdown voltage VTX within a threshold period of time).

As shown in FIG. 4D, the overcurrent protection device remains in a non-saturated on-state because a feedback signal from the control circuit does not cause the overcurrent protection device to change to a current-limiting state in response to the voltage across the overvoltage protection device. In this embodiment, the control circuit is configured to cause the overcurrent protection device to change to the on-state in response to the voltage across the overvoltage protection device rising to the triggering breakdown voltage VTX.

Although not shown, if the voltage across the overvoltage protection device had risen to, or exceeded, the triggering breakdown voltage VTX, the overcurrent protection device could change to the current-limiting state from the on-state. The change could be triggered by the control circuit in response to the voltage across the overvoltage protection device rising to, or exceeding, the triggering breakdown voltage VTX. In such instances, current through the overcurrent protection device and/or the overvoltage protection device could be limited (e.g., reduced) while the overcurrent protection device is in the current-limiting state.

As shown in FIG. 4E, the current through the overcurrent protection device increases at approximately time U1 and remains at the increased level during the energy pulse between times U1 and U2. As shown in FIG. 4E, the current associated with the energy pulse in this embodiment is substantially constant. Although not shown, in some embodiments, the current (and/or voltage) associated with the energy pulse could vary. In such instances, the current through the overcurrent protection device could vary, the temperature of the overvoltage protection device (shown in FIG. 4A) may increase in a non-linear fashion, and/or the voltage across the overvoltage protection device (shown in FIG. 4C) may also increase in a non-linear fashion.

Although the saturation current is not shown, the current through the overcurrent protection device does not reach the saturation current of the overcurrent protection device. Thus, the overcurrent protection device does not change to a current-limiting state. In some embodiments, current associated with an energy pulse can be limited to the saturation current when the overcurrent protection device (e.g., such as a JFET) saturates. Also, although not shown, the temperature of the overcurrent protection device also remains below a failure temperature of the overcurrent protection device.

FIGS. 5A through 5E are graphs that illustrate the behavior of components of an input power protection device in response to another energy pulse. The input power protection device includes an overvoltage protection device, a control circuit, and an overcurrent protection device such as those shown in FIGS. 1 and 2. The graphs illustrate power protection provided by the components of the input power protection device in response to an energy pulse.

Figure 5A:
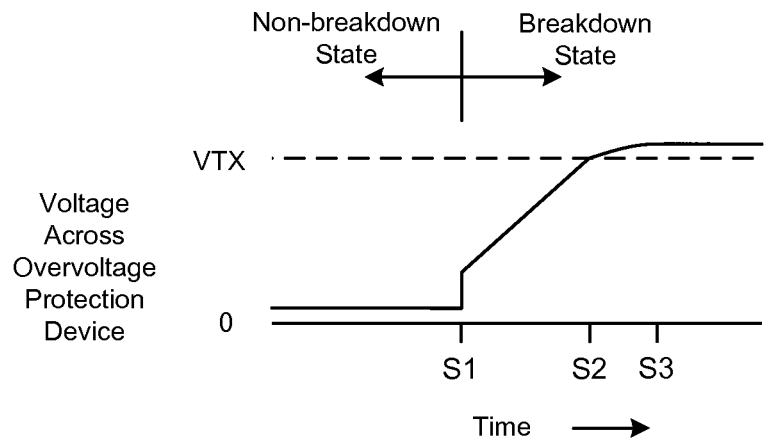
FIGS. 5A through 5E are graphs that illustrate the behavior of components of an input power protection device in response to another energy pulse.
Figure 5B:
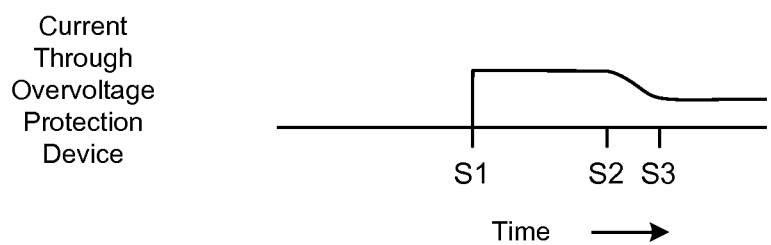
Figure 5C:
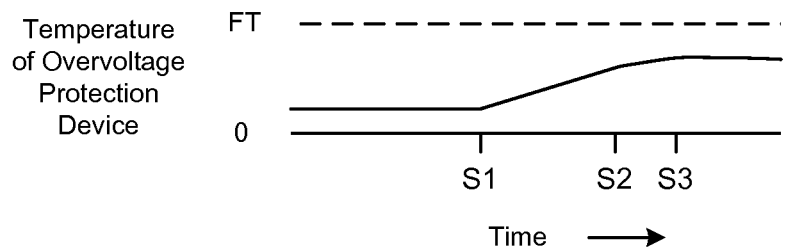
Figure 5D:
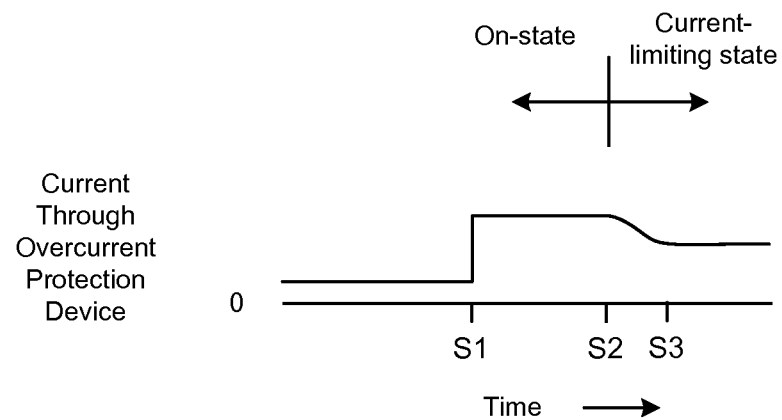
Figure 5E:
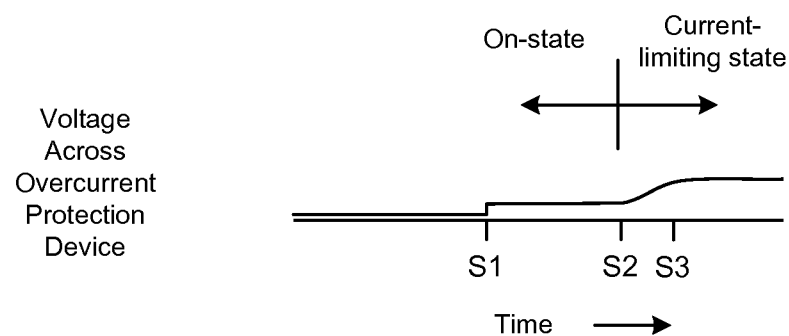

Specifically, FIG. 5A is a graph that illustrates a voltage across an overvoltage protection device, FIG. 5B is a graph that illustrates a current through the overvoltage protection device, and FIG. 5C is a graph that illustrates a temperature of the overvoltage protection device. FIG. 5D is a graph that illustrates a current through an overcurrent protection device, and FIG. 5E is a graph that illustrates a voltage across the overcurrent protection device. In FIGS. 5A through 5E, time is increasing to the right, and the energy pulse starts at approximately time 51 and continues beyond (e.g., is sustained beyond) time S3.

As shown in FIG. 5A, in response to the energy pulse starting at approximately time S1, the voltage across the overvoltage protection device increases abruptly approximately at time S1. In this embodiment, the overvoltage protection device (which can be a zener diode) changes to a breakdown state from a non-breakdown state (e.g., a normal operational state, an off state) in response to the energy pulse at approximately time S1. Accordingly, the voltage across the overvoltage protection device beyond time S1 is approximately the breakdown voltage of the overvoltage protection device.

As shown in FIG. 5B, current from the energy pulse begins to flow through the overvoltage protection device in response to the overvoltage protection device changing to the breakdown state from the non-breakdown state (e.g., normal operational state, off-state) at approximately time S1. In other words, when the overvoltage protection device changes to the breakdown state in response to the energy pulse, the overvoltage protection device starts to shunt current associated with the energy pulse through the overvoltage protection device. The shunting of current through the overvoltage protection device causes an increase in temperature of the overvoltage protection device starting at approximately time S1 as shown in FIG. 5C.

The temperature of (e.g., the temperature of a junction of, the temperature of a semiconductor substrate of) the overvoltage protection device increases starting at approximately time S1 until shortly after time S2 as shown in FIG. 5C. In this embodiment, the temperature of the overvoltage protection device increases approximately linearly between times S1 and S2. As described in connection with FIGS. 4A through 4E, the rate of the temperature increase of the overvoltage protection device can depend on heat sinks, heat sources, and/or so forth.

As shown in FIG. 5A, the voltage across the overvoltage protection device while in the breakdown state increases as the temperature of the overvoltage protection device increases as shown in FIG. 5C. In this embodiment, the voltage across the overvoltage protection device (which is approximately equivalent to the breakdown voltage of the overvoltage protection device) reaches, or exceeds, the triggering breakdown voltage VTX at approximately time S2.

Also as shown in FIG. 5C, the temperature of the overvoltage protection device remains below a fail temperature FT (also can be referred to as a breakdown temperature). In some embodiments, the overvoltage protection device can fail short when the temperature of the overvoltage protection device exceeds the fail temperature FT. For example, if the overvoltage protection device is a zener diode, migration of metals across a PN junction of the zener diode in response to a temperature above the fail temperature FT of the zener diode can result in a short within the zener diode (e.g., across the PN junction).

As shown in FIG. 5D, the current through the overcurrent protection device increases at approximately time S1 and remains at the increased level between times S1 and S2. As shown in FIG. 5D, the current associated with the energy pulse in this embodiment is substantially constant. Although not shown, in some embodiments, the current (and/or voltage) associated with the energy pulse could vary. In such instances, the current through the overcurrent protection device could vary, the temperature of the overvoltage protection device (shown in FIG. 5A) may increase in a non-linear fashion, and/or the voltage across the overvoltage protection device (shown in FIG. 5B) may also increase in a non-linear fashion.

Although the saturation current is not shown, the current through the overcurrent protection device does not reach the saturation current of the overcurrent protection device between times S1 and S2. Also, although not shown, the temperature of the overcurrent protection device also remains below a failure temperature of the overcurrent protection device.

As shown in FIG. 5D, the overcurrent protection device changes from an on-state (while in a non-saturated state) to a current-limiting state at approximately time S2. In this embodiment, the overcurrent protection device changes to the current-limiting state in response to the voltage across the overvoltage protection device rising to the triggering breakdown voltage VTX. In some embodiments, the overcurrent protection device can be triggered to change from the on-state to the current-limiting state at approximately time S2 via a control circuit that produces a feedback signal based on the voltage of the overvoltage protection device reaching, or exceeding, the triggering breakdown voltage VTX.

When in the current-limiting state (after approximately time S2) the overcurrent protection device is saturated. Thus, current through the overcurrent protection device is limited by the saturation of the overcurrent protection device. As shown in FIG. 5D, current through the overcurrent protection device decreases starting at approximately time S2 until approximately time S3.

As shown in FIG. 5E, the voltage across the overcurrent protection device initially increases (from a nominal or zero voltage) at approximately time S1 with the onset of the energy pulse. The decreasing current through the overcurrent protection device corresponds with an additional increase in voltage (starting at approximately time S2) across the overcurrent protection device as shown in FIG. 5E, which results in a decreasing saturation current of the overcurrent protection device. In other words, a voltage drop across the overcurrent protection device increases and causes the overcurrent protection device to limit current while in the current-limiting state (to the saturation current of the overcurrent protection device).

In response to the overcurrent protection device decreasing current while in the current-limiting state (as shown in FIG. 5D), current through the overvoltage protection device is also decreased starting at approximately time S2 as shown in FIG. 5B. The decreasing current through the overvoltage protection device results in a decrease in the rate of increase in temperature of the overvoltage protection device as shown in FIG. 5C.

Although not shown, in some embodiments, a time lag in the decrease in temperature of the overvoltage protection device (and/or other components of the input power protection device) can occur during operation of the input power protection device. In some embodiments, a time lag can be caused by heat stored in components around the overvoltage protection device and/or the overcurrent protection device for a hysteresis effect. In some embodiments, the temperature of the overvoltage protection device may decrease immediately (or substantially immediately) in response to current being limited by the overcurrent protection device when in the current-limiting state.

As shown in FIG. 5C, the decrease in temperature of the overvoltage protection device results in the decrease in the voltage across the overvoltage protection device shown in FIG. 5A. However, because the energy pulse continues beyond time S3, the overvoltage protection device remains in the breakdown state (and has a voltage approximately at the breakdown voltage).

In this embodiment, the input power protection device reaches a steady-state operating point after the voltage across the overvoltage protection device exceeds the triggering breakdown voltage VTX. In this embodiment, the steady-state operating point is asymptotically attained at approximately time S3 for the devices as shown in FIGS. 5A through 5E. The steady-state operating point of the input power protection device is attained through voltage, current, and temperature interactions between the components of the input power protection device. This steady-state operating capability is an advantage over a silicon switch-type device which may not continue operation during a transient event (e.g., an energy pulse event).

Specifically, the current through the overcurrent protection device (shown in FIG. 5D) is decreased as the voltage across the overvoltage protection device increases beyond the triggering breakdown voltage VTX (shown in FIG. 5A) with increasing temperature (shown in FIG. 5C) caused by current through the overvoltage protection device (shown in FIG. 5B). In a feedback fashion, the overcurrent protection device decreases current through the overcurrent protection device (shown in FIG. 5D) that also decreases current that flows through the overvoltage protection device (shown in FIG.

5B), which results in a decreasing temperature (shown in FIG. 5C) and a decreasing voltage across the overvoltage protection device (shown in FIG. 5A) (which could remain above the triggering breakdown voltage VTX). Eventually, the components of the input power protection device settle at a steady-state operating point based on these counteracting interactions. In some embodiments, the input power protection device could oscillate before settling at a steady-state operating point.

Although not shown in FIGS. 5A through 5E, in some embodiments, oscillations can occur before the steady-state operating point is attained at approximately time S3. Although not explicitly shown, the voltage cross the overvoltage protection device is a function of both current and temperature. Therefore, higher current pulses can result in current limiting (e.g., faster current limiting than shown) at lower temperatures (which can result in improved power protection). In such embodiments, power protection could occur (or can be triggered) a time that is earlier than time S2 as illustrated in FIGS. 5A through 5E.

Although the behavior of the components described in connection with FIGS. 3A through 5E are described as, for example, making transitions at specified voltages, currents, and/or at specified times, when implemented (e.g., implemented using semiconductor devices), the transitions of the components may occur slightly before or slightly after the specified voltages, currents, and/or specified times. Specifically, variations in breakdown voltages, thermal conductivity, processing variations, temperature variations, switching times of devices, circuit transition delays, and/or so forth can result in conditions (e.g., non-ideal conditions) that can trigger transitions of components slightly before or slightly after the voltages, currents, temperatures, and/or times in FIGS. 3A through 5E.

Figure 6:
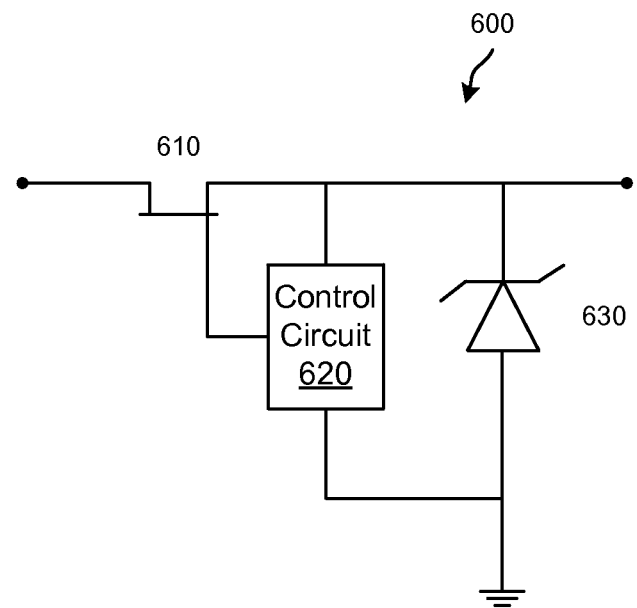
FIG. 6 is a schematic of an input power protection device including a control circuit.

FIG. 6 is a schematic of an input power protection device 600 including a control circuit 620. As shown in FIG. 6, the input power protection device 600 includes a JFET device 610, which functions as an overcurrent protection portion of the input power protection device 600. The input power protection device 600 also includes a zener diode 630 (which can be a type of TVS diode and can be generally referred to as a zener diode device), which functions as an overvoltage protection portion of the input power protection device 600.

The control circuit 620 shown in FIG. 6 can be any kind of control circuit configured to provide a feedback signal to the JFET device 610 so that the JFET device 610 operates in the current-limiting state in response to a voltage across the zener diode 630. In some embodiments, the control circuit 620 can be, or can include, for example, electronic components, sensors, transistors, microprocessors, application-specific integrated circuits (ASICs), discrete components, and/or so forth.

Figure 7:
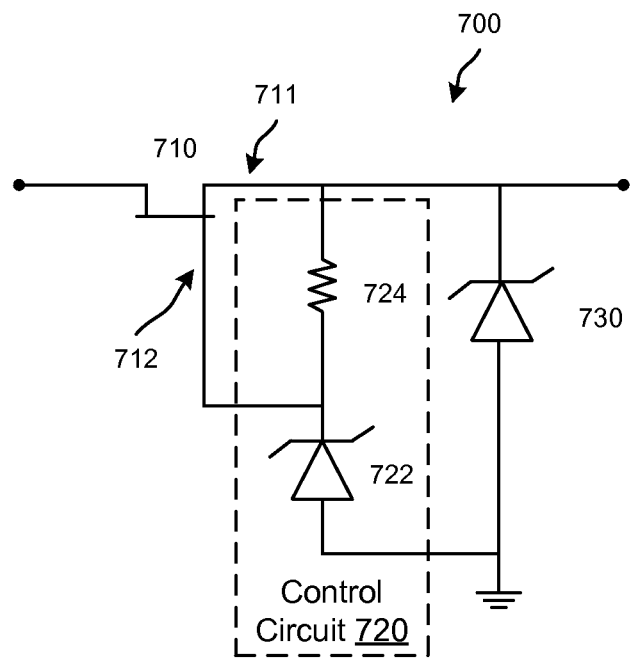
FIG. 7 is a schematic of another input power protection device including a control circuit.

FIG. 7 is a schematic of another input power protection device 700 including a control circuit 720. As shown in FIG. 7, the input power protection device 700 includes a JFET device 710, which functions as an overcurrent protection portion of the input power protection device 700. The input power protection device 700 also includes a zener diode 730 (which can be a type of TVS diode and can be generally referred to as a zener diode device), which functions as an overvoltage protection portion of the input power protection device 700.

The control circuit 720 shown in FIG. 7 includes a resistor 724 and a zener diode 722. The resistor 724 is coupled between a gate 712 and a source 711 of the JFET device 710. In this embodiment, the zener diode 722 is configured to cause the JFET device 710 to change to a current-limiting state and completely (or nearly completely) turn off a channel of the JFET device 710 (so that current does not flow through the JFET device 710) in response to the zener diode 722 failing short.

Specifically, the zener diode 722 can be configured to change conduction state from a voltage regulation state to a shorted state (e.g., a high conduction/low resistance state), which is a thermally induced shorted state (e.g., irreversible shorted state). When in the voltage regulation state, the zener diode 722 can be configured to limit (e.g., clamp) a voltage at a breakdown voltage (e.g., a voltage limit, a clamping voltage), thereby increasing the sensitivity of the JFET device 710 to variations in voltage of the zener diode 730. In some embodiments, the resistance of resistor 724 and/or the power capacity of the zener diode 722 can be configured (e.g., configured using a doping concentration and/or metal structures) so that the shorted state of the zener diode 722 can be a failure mode of the device where a physical change in the structure of the zener diode 722 causes the shorting. Specifically, the zener diode 722 can be configured to change from the voltage regulation state to the shorted state in response to a temperature of the zener diode 722 increasing beyond a threshold temperature (e.g., a failure temperature, a shorting temperature). For example, migration of metals across a PN junction of the zener diode 722 in response to a temperature above a threshold temperature BT of the zener diode 722 (generated by internal heating and/or heat from the JFET device 710, the resistor 724, and/or the zener diode 730) can result in a short within the zener diode 722 (e.g., across the PN junction). In some embodiments, the threshold temperature BT can be between, for example, 200 and 700 degrees Fahrenheit (e.g., 350 degrees Fahrenheit, 400 degrees Fahrenheit, 450 degrees Fahrenheit).

In some embodiments, once the zener diode 722 has changed to the shorted state, the zener diode 722 may not change back to the voltage regulation state. In other words, a change to the shorted state from the voltage regulation state can be an irreversible change (e.g., physical change). The irreversible operation of the input power protection device 700 shown in FIG. 7 is contrasted with the reversible operation of the input power protection devices described above.

In some embodiments, the operation of the zener diode 722 can be separate from the shorted state operation of the zener diode 730. In other words, the zener diode 730 can be configured to trigger the JFET device 710 to change to the current-limiting state without the zener diode 722 failing short. Likewise, the zener diode 722 can be configured to change to the shorted state and can cause the JFET device 710 to change to the current-limiting state (and turn off) without zener diode 730, for example, exceeding a breakdown voltage of the zener diode 730. In some embodiments, the zener diode 722 can be configured to change to a reversible heat-shorted (or high conduction) state due to a thermally-induced second breakdown mechanism. The temperature of the reversible heat-shorted state can be defined using, for example, a doping concentration within the zener diode 722.

Figure 8A:
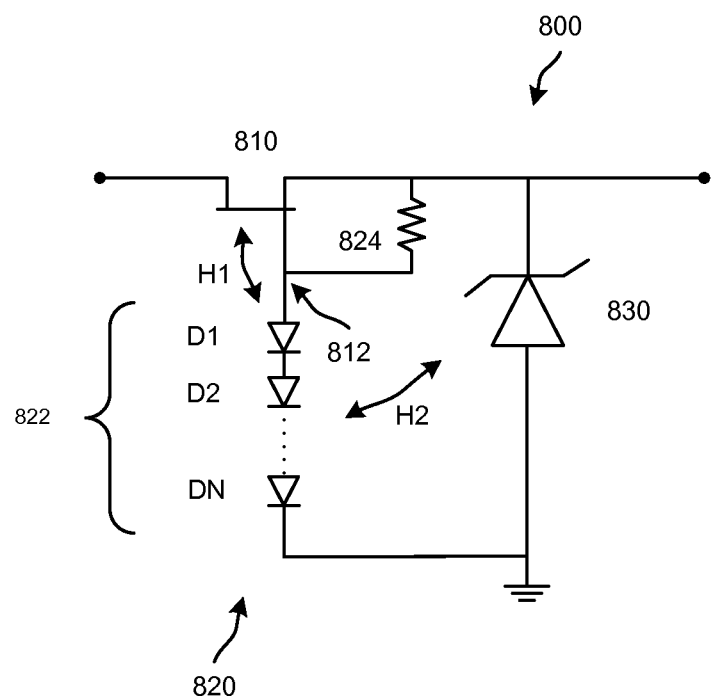
FIG. 8A is a schematic of yet another input power protection device including a control circuit.

FIG. 8A is a schematic of yet another input power protection device 800 including a control circuit 820. As shown in FIG. 8A, the input power protection device 800 includes a JFET device 810, which functions as an overcurrent protection portion of the input power protection device 800. The input power protection device 800 also includes a zener diode 830 (which can be a type of TVS diode and can be generally referred to as a zener diode device), which functions as an overvoltage protection portion of the input power protection device 800.

The control circuit 820 shown in FIG. 8A includes a resistor 824 and forward-biased diodes 822 (which includes diodes D1 through DN). The resistor 824 is coupled between a gate 812 and a source 811 of the JFET device 810. In this embodiment, the diodes 822 are configured to operate with the zener diode 830 to accelerate changing of the JFET device 810 to a current-limiting state. Specifically, the diodes 822 can be configured to pull a voltage of a gate 812 of the JFET device 810 towards ground in response to the temperature of the diodes 822 increasing. In some embodiments, the diodes 822 can include more than 3 diodes (e.g., 25 diodes, 100 diodes). In some embodiments the diodes 822 can include less than 3 diodes (e.g., one diode, two diodes).

As shown in FIG. 8A, the temperature of the diodes 822 can be increased in response to heat H1 transferred to the diodes 822 from the JFET device 810. Also, the temperature of the diodes 822 can be increased in response to heat H2 transferred to the diodes 822 from the zener diode 830. In some embodiments, heat H2 can be produced in response to current flowing through the zener diode 830. In some embodiments, the temperature of the diodes 822 can be increased in response to current flowing through the diodes 822, which can be forward biased when current is flowing through the diodes 822.

In some embodiments, the resistor 724 (which can be thermally coupled to the JFET device 810 and/or the zener diode 830) can have a positive temperature coefficient (PTC) to contribute to (or primarily cause) accelerated turn-off of the JFET device 810. In some embodiments, a resistor (which can be thermally coupled to the JFET device 810 and/or the zener diode 830) that has a negative temperature coefficient (NTC) can be used in lieu of one or more of the diodes 822 to produce the accelerated turn-off effect that is produced by the diodes 822. The use of one or more NTC and/or PTC resistive devices can, in some embodiments, obviate the need for the zener diode 830 to exhibit a PTC characteristic.

Figure 8B:
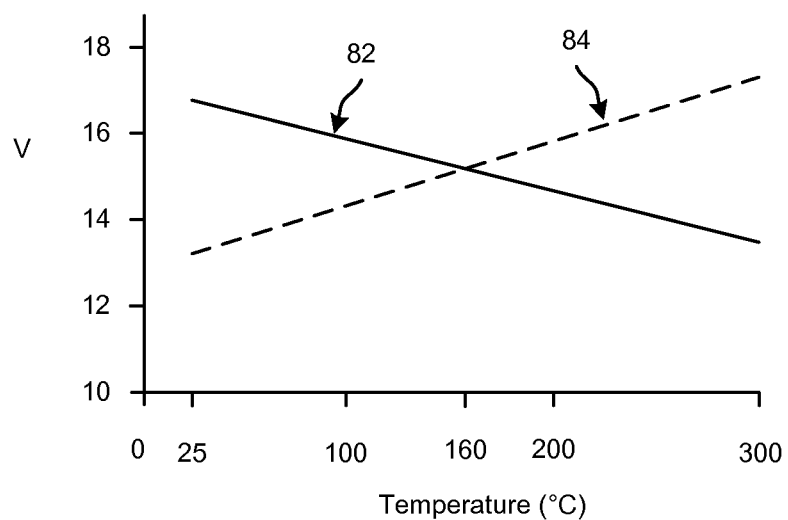
FIG. 8B is a graph that illustrates temperature characteristics of the zener diode and the diodes shown in FIG. 8A.

FIG. 8B is a graph that illustrates the temperature characteristics of the zener diode 830 and the diodes 822 shown in FIG. 8A. The graph in FIG. 8B assumes that the diodes 822 includes 24 diodes (with a room temperature forward voltage drop of approximately 0.7 V). As shown in FIG. 8B, the voltage 82 across the diodes 822 decreases with increasing temperature, and the voltage 84 across the zener diode increases with increasing temperature. The voltage 84 across the zener diode 830 is approximately 13.2 V at approximately 25° C., and the voltage 82 across the diodes 822 is approximately 16.6 V at approximately 25° C.

As shown in FIG. 8B, the gate to source voltage ($V_{GS}$) of the JFET device 810 at approximately 160° C. is approximately 0 V because that is the point at which the voltage across the diodes 822 is equal to the voltage across the zener diode 830 (assuming that the input power protection device 800 is receiving an energy pulse and that the resistance 824 is relatively small). At temperatures beyond 160° C., the difference between the voltage 84 across the zener diode 830 and the voltage 82 across the diodes 822 can drive an increase in the gate voltage applied to the JFET device 810. In some embodiments, even though the channel of the JFET device 810 may start to turn off at a temperature greater than approximately 160° C., In some embodiments, even though the channel of the JFET device 810 may start to turn off at a temperature greater than approximately 160° C., the JFET device 810 may not limit current through the JFET device 810 because the JFET device 810 may not yet be saturated. As shown in FIG. 8B, the positive temperature coefficient of breakdown voltage of the zener diode 830 is used in conjunction with the negative temperature coefficient of the diodes 822 to trigger the JFET device 810 to limit current through the JFET device 810.

FIG. 8C is a table that illustrates example specifications for components of the input power protection device 800 shown in FIG. 8A. In this embodiment, when the VGS of the zener diode 830 is exceeded, the JFET device 810 will turn completely off (or nearly completely off). Although not shown, the temperature at which JFET device 810 is turned off (or nearly completely off) can be lowered by increasing the breakdown voltage of the zener diode 830 and/or by reducing the total voltage drop of the diodes 822 (through fewer diodes or lowering the forward drop voltage of at least some of the diodes 822). It follows that the temperature at which JFET device 810 is turned off (or nearly completely off) can be increased by lowering the breakdown voltage of the zener diode 830 and/or by increasing the total voltage drop of the diodes 822 (through more diodes or increasing the forward drop voltage of at least some of the diodes 822). Similarly, JFET device 810 can be configured to saturate and turn off (or nearly completely off) at a lower or higher voltages if the $V_{GS}$ turn-off voltage of the JFET device 810 is decreased or increased, respectively.

The parameters shown in FIG. 8C are presented by way of example only. In some embodiments, the parameters of the JFET device 810 can be different than those shown in FIG. 8C. For example, the minimum $BV_{GDS}$ can be higher than 26 V or lower than 26 V. As another example, the $V_G$ (off) can be higher than −2 V or lower than −2 V.

Figure 9:
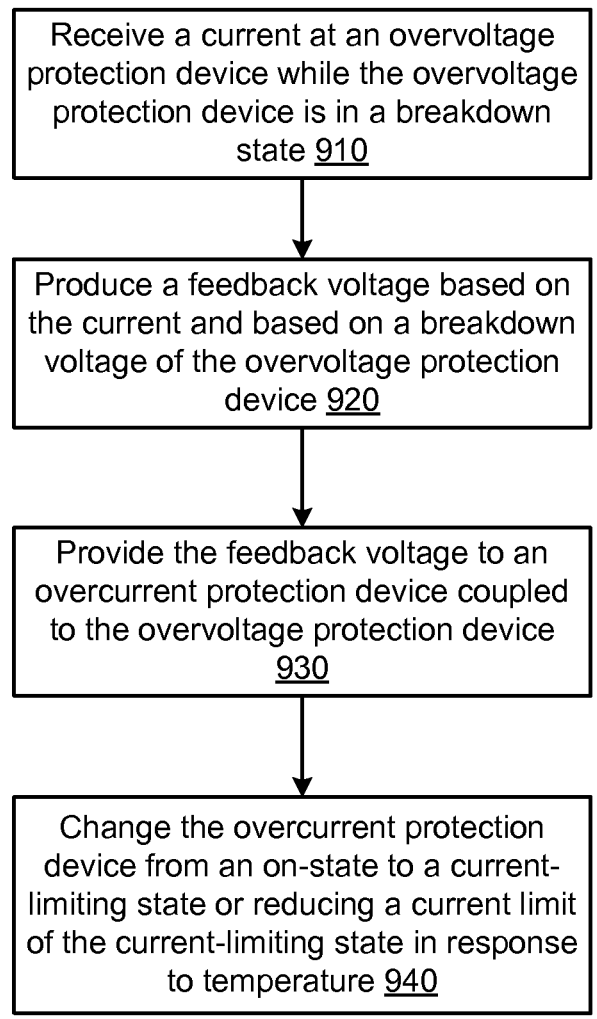
FIG. 9 is a flowchart that illustrates a method for operating an input power protection device.

FIG. 9 is a flowchart that illustrates a method for operating an input power protection device. The input power protection device can be similar to, or the same as, one or more of the input power protection devices described above (e.g., the input power protection device 100 described in connection with FIG. 1).

As shown in FIG. 9, a current is received at an overvoltage protection device while the overvoltage protection device is in a breakdown state (block 910). In some embodiments, the current can be associated with a transient event such as an energy pulse. In some embodiments, the transient event can be configured to trigger the overvoltage protection device to change to the breakdown state. In some embodiments, the overvoltage protection device can be a zener diode.

A feedback voltage is produced based on the current and based on a breakdown voltage of the overvoltage protection device (block 920). In some embodiments, the feedback voltage is a function of voltage rise of the overvoltage protection device based on temperature (which is a function of current through the overvoltage protection device). In some embodiments, the feedback voltage can be produced by a control circuit. In some embodiments, the control circuit can include one or more resistors, diodes, zener diodes, and/or so forth. In some embodiments, the control circuit can include one or more components that has a voltage that decreases in response to temperature. Thus, at least one or more portions of the control circuit can have a negative temperature coefficient.

The feedback voltage is provided to an overcurrent protection device coupled to the overvoltage protection device (block 930). In some embodiments, the overcurrent protection device can be a JFET device, an ACCUFET device, and/or so forth. In some embodiments, the overcurrent protection device can be serially disposed within an input power protection device and can have an output terminal coupled to the overvoltage protection device. In some embodiments, the feedback voltage can be provided by a control circuit coupled to the overcurrent protection device and the over voltage protection device.

The overcurrent protection device is changed from an on-state to a current-limiting state or a current limit of the current-limiting state is reduced in response to temperature (block 940). In some embodiments, the overcurrent protection device can be configured to operate in a saturated state when in the current-limiting state. In some embodiments, the breakdown voltage of the overvoltage protection device can increase in response to heat. Thus, the overvoltage protection device can have a breakdown voltage with a positive temperature coefficient. In some embodiments, the point at which the overcurrent protection device changes to the current-limiting state can depend on the level of energy (e.g., the level of current, level of heat) associated with an energy pulse. In some embodiments, one or more portions of an input power protection device can be integrated into a single discrete component to facilitate heat transfer between the portion(s) of the input power protection device.

In one general aspect, an apparatus can include an overcurrent protection device, and an overvoltage protection device coupled to the overcurrent protection device and configured to cause the overcurrent protection device to decrease a current through the overvoltage protection device after a breakdown voltage of the overvoltage protection device increases in response to heat.

Implementations of the various techniques described herein may be implemented in digital electronic circuitry, or in computer hardware, firmware, software, or in combinations of them. Portions of methods may be performed by, and an apparatus (e.g., the input power protection device) may be implemented within, special purpose logic circuitry, e.g., an FPGA (field programmable gate array) or an ASIC (application-specific integrated circuit).

Some implementations may be implemented using various semiconductor processing and/or packaging techniques. Some embodiments may be implemented using various types of semiconductor processing techniques associated with semiconductor substrates including, but not limited to, for example, Silicon (Si), Galium Arsenide (GaAs), Silicon Carbide (SiC), and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
an input terminal;
an output terminal;
an overcurrent protection device coupled with the input terminal and the output terminal, the overcurrent protection device being configured to control a current through the overcurrent protection device in response to a control voltage; and
an overvoltage protection device coupled to the overcurrent protection device and the output terminal, the overvoltage protection device being configured to cause the overcurrent protection device to decrease the current through the overcurrent protection device in response to thermally induced changes in a clamping voltage of the overvoltage protection device.

2. The apparatus of claim 1, further comprising:
a control circuit coupled to the overcurrent protection device and coupled to the overvoltage protection device, the control voltage being controlled based on a thermal response of the control circuit.

3. The apparatus of claim 1, wherein the overvoltage protection device is configured to cause the overcurrent protection device to decrease the current in response to the clamping voltage of the overvoltage protection device exceeding a triggering breakdown voltage while the overvoltage protection device is in a breakdown state.

4. The apparatus of claim 1, wherein the overvoltage protection device is configured to cause the overcurrent protection device to decrease the current via a feedback signal produced based on a voltage across the overvoltage protection device.

5. The apparatus of claim 1, further comprising:
a voltage divider coupled in parallel to the overvoltage protection device and including at least one resistor, the overvoltage protection device configured to cause the overcurrent protection device to decrease the current based on a feedback voltage produced via the voltage divider.

6. The apparatus of claim 1, further comprising:
a voltage divider coupled in parallel to the overvoltage protection device and including at least one resistor and a plurality of diodes,
the overcurrent protection device being saturated when the overcurrent protection device decreases the current through the overvoltage protection device.

7. The apparatus of claim 1, further comprising:
a voltage divider coupled in parallel to the overvoltage protection device and including at least one resistor and a plurality of diodes.

8. The apparatus of claim 1, further comprising:
a voltage divider integrated into a package with the overvoltage protection device and the overcurrent protection device, the voltage divider being thermally coupled to at least one of the overvoltage protection device or the overcurrent protection device.

9. The apparatus of claim 1, wherein the overcurrent protection device has a first terminal configured to be coupled to a power source, the overcurrent protection device has a second terminal coupled to the overvoltage protection device.

10. The apparatus of claim 1, wherein the overcurrent protection device includes a junction field effect transistor device that has a channel disposed between a power source and the overvoltage protection device.

11. The apparatus of claim 1, wherein the overvoltage protection device includes a zener diode, the clamping voltage of the zener diode having a positive temperature coefficient.

12. The apparatus of claim 1, further comprising:
a control circuit thermally coupled to at least one of the overvoltage protection device or the overcurrent protection device, heat from the at least one of the overvoltage protection device or overcurrent device causes the control circuit to reduce the control voltage at which current through the overcurrent protection device is decreased.

13. The apparatus of claim 12, wherein the control circuit includes at least one of a negative temperature coefficient device, a positive temperature coefficient device, or a plurality of diodes.

14. The apparatus of claim 1, wherein the overcurrent protection device includes a semiconductor switching device configured to change from an on-state to a current-limiting state, the overcurrent protection device is configured to decrease the current while in the current-limiting state based on voltage feedback to a control pin of the semiconductor switching device.

15. A method, comprising:
receiving, via an overcurrent protection device, a current at an overvoltage protection device while the overvoltage protection device is in a breakdown state;
producing a feedback voltage based on the current and based on a breakdown voltage of the overvoltage protection device;
providing the feedback voltage to the overcurrent protection device coupled to the overvoltage protection device; and
changing the overcurrent protection device from an on-state to a current-limiting state or reducing a current limit of the current-limiting state in response to a temperature change of the overvoltage protection device.

16. The method of claim 15, further comprising:
modifying a current limit of the current-limiting state in response to a change in the breakdown voltage of the overvoltage protection device.

17. The method of claim 15, wherein the breakdown voltage of the overvoltage protection device exceeds a triggering breakdown voltage when the breakdown voltage changes from a first voltage below the triggering breakdown voltage to a second voltage above the triggering breakdown voltage.

18. The method of claim 15, wherein a temperature of the overvoltage protection device increases in response to the current through the overvoltage protection device, the breakdown voltage of the overvoltage protection device increases in response to the increase in temperature until the breakdown voltage exceeds a triggering breakdown voltage.

19. The method of claim 15, wherein heat from at least one of the overvoltage protection device or the overcurrent device causes a control circuit to reduce a triggering breakdown voltage.

20. The method of claim 15, wherein the current through the overvoltage protection device is decreased in response to the changing of the overcurrent protection device from the on-state to the current-limiting state.

21. The method of claim 15, wherein the changing is performed at a first time, the current through the overvoltage protection device is decreased in response to the changing, at the first time, of the overcurrent protection device from the on-state to the current-limiting state, the temperature of the overvoltage protection device decreases in response to the decrease in current, the breakdown voltage of the overvoltage protection device falls below a triggering breakdown voltage in response to the decrease in temperature,
the method further comprising:
changing, at a second time after the first time, the overcurrent protection device from the current-limiting state to the on-state in response to the breakdown voltage of the overvoltage protection device falling below the triggering breakdown voltage.

22. The method of claim 15, wherein the current received at the overvoltage protection device is associated with an overvoltage event.

23. An apparatus, comprising:
a first terminal configured to receive a supply voltage;
a second terminal configured to provide the supply voltage to a circuit load;
an overvoltage protection device coupled with the second terminal, the overvoltage protection device having a voltage limit configured to increase in response to an increase in temperature of the overvoltage protection device;
an overcurrent protection device coupled to the first terminal, the second terminal and the overvoltage protection device, the overcurrent protection device being biased to an on-state; and
a control circuit operatively coupled with the overvoltage protection device, the control circuit being configured to provide, to the overcurrent protection device, at least a portion of a voltage across the overvoltage protection device, at least the portion of the voltage across the overvoltage protection device is configured to trigger the overcurrent protection device to change from the on-state to a current-limiting state, or reducing a current limit of the current-limiting state in response to temperature changes of the overvoltage protection device.

24. The apparatus of claim 23, wherein the at least the portion of the voltage across the overvoltage protection device is configured to trigger the overcurrent protection device to change from the on-state to a current-limiting state when the voltage limit increases in response to heat and exceeds a triggering threshold voltage.

25. The apparatus of claim 23, wherein the control circuit includes a voltage divider coupled in parallel to the overvoltage protection device, the overcurrent protection device includes a junction field effect transistor device, and the overvoltage protection device includes a zener diode.

26. The apparatus of claim 23, wherein the control circuit is configured to reduce a triggering threshold voltage of the overcurrent protection device in response to heat from at least one of the overcurrent protection device or the overvoltage protection device.

27. The apparatus of claim 23, wherein the overcurrent protection device includes a semiconductor device configured to change from the on-state to a current-limiting state or reduce its current limiting state in response to a control voltage.

28. The apparatus of claim 23, wherein the control circuit includes a zener diode configured to change from a voltage regulation state to a shorted state.

* * * * *